US012317321B2

(12) United States Patent
Fan et al.

(10) Patent No.: US 12,317,321 B2
(45) Date of Patent: May 27, 2025

(54) RESOURCE CONFIGURATION METHOD AND DEVICE

(71) Applicant: HUAWEI TECHNOLOGIES CO., LTD., Guangdong (CN)

(72) Inventors: Weiwei Fan, Shanghai (CN); Jiayin Zhang, Shanghai (CN); David Jean-Marie Mazzarese, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 17/721,608

(22) Filed: Apr. 15, 2022

(65) Prior Publication Data

US 2022/0248466 A1 Aug. 4, 2022

Related U.S. Application Data

(63) Continuation of application No. PCT/CN2019/111338, filed on Oct. 15, 2019.

(51) Int. Cl.

*H04W 74/0816* (2024.01)
*H04W 72/0446* (2023.01)
*H04W 72/1263* (2023.01)
*H04W 74/00* (2009.01)
*H04W 74/08* (2009.01)

(52) U.S. Cl.

CPC ... *H04W 74/0816* (2013.01); *H04W 72/0446* (2013.01); *H04W 72/1263* (2013.01); *H04W 74/004* (2013.01); *H04W 74/0866* (2013.01)

(58) Field of Classification Search

CPC ........... H04W 74/0816; H04W 74/004; H04W 74/0866; H04W 72/0446; H04W 72/1263

See application file for complete search history.

(56) References Cited

U.S. PATENT DOCUMENTS 12,048,009 B2 * 7/2024 Iyer .................. H04W 74/0816
2017/0238249 A1 8/2017 Yoon et al.
(Continued)

FOREIGN PATENT DOCUMENTS

CN 106162658 A 11/2016
CN 107079494 A 8/2017
(Continued)

OTHER PUBLICATIONS

Nokia Networks: "UL LBT and Configurable Frame Structure for UL/DL operation", 3GPP Draft; R1-152817, May 24, 2015, XP050969769, total 5 pages.
(Continued)

*Primary Examiner* — Blake J Rubin

(57) ABSTRACT

Embodiments of this application provide an unlicensed frequency band-based resource configuration method and an apparatus, to resolve a problem of configuring a fixed frame period FFP for a terminal device operating in an unlicensed frequency band in a current technology. The method includes: A network device sends fixed frame period FFP configuration information to a terminal device, where the FFP configuration information indicates an FFP configuration of the terminal device, an FFP is a period used by the terminal device to transmit a signal, the FFP includes channel occupancy time COT and an idle period Idle period, the channel occupancy time COT is used by the terminal device to transmit the signal, and the idle period is used by the terminal device to perform LBT.

14 Claims, 8 Drawing Sheets

(56) References Cited

U.S. PATENT DOCUMENTS

| | | | | |
|---|---|---|---|---|
| 2017/0318607 | A1 | 11/2017 | Tiirola et al. | |
| 2018/0192442 | A1* | 7/2018 | Li | H04W 74/0808 |
| 2019/0335456 | A1* | 10/2019 | Yerramalli | H04W 74/0808 |
| 2020/0178297 | A1* | 6/2020 | Park | H04W 74/0808 |
| 2020/0396767 | A1* | 12/2020 | Talarico | H04W 74/0808 |
| 2021/0100030 | A1* | 4/2021 | Myung | H04W 74/0833 |
| 2021/0298045 | A1* | 9/2021 | Kim | H04W 72/0453 |
| 2022/0070922 | A1* | 3/2022 | Talarico | H04W 74/0808 |
| 2022/0225412 | A1* | 7/2022 | Tooher | H04W 72/0453 |
| 2022/0287094 | A1* | 9/2022 | Tooher | H04L 5/005 |
| 2022/0377790 | A1* | 11/2022 | Awadin | H04W 74/006 |
| 2022/0407663 | A1* | 12/2022 | Tooher | H04W 24/10 |
| 2023/0035989 | A1* | 2/2023 | Awadin | H04W 72/569 |
| 2024/0098781 | A1* | 3/2024 | Tsai | H04W 74/0808 |

FOREIGN PATENT DOCUMENTS

| | | | |
|---|---|---|---|
| CN | 109314967 | A | 2/2019 |
| EP | 3836721 | A1 | 6/2021 |

OTHER PUBLICATIONS

Huawei et al: “Transmission with configured grant in NR unlicensed band”, 3GPP Draft; R1-1906047, May 13, 2019, XP051727504, total 22 pages.

Convida Wireless: “Autonomous Uplink Transmission in NR Unlicensed”, 3GPP Draft; R1-1809382,Aug. 11, 2018, XP051516746, total 5 pages.

Huawei, HiSilicon Coexistence and channel access for NR unlicensed band operations[online] 3GPP TSG RAN WG1 #98b R1-1910045,Oct. 8, 2019,total 19 pages.

NTT Docomo, Inc., Configured grant enhancement for NR-U. 3GPP TSG RAN WG1 #98bis, Chongqing, China, Oct. 14-20, 2019, R1-1911163, 8 pages.

Intel Corporation, “Channel access mechanism for NR-unlicensed”, 3GPP TSG RAN WG1 Meeting #97 R1-1906785, May 17, 2019,total 17 pages.

ETSI EN 301 893 V2.1.1 (May 2017), 5 GHz RLAN;Harmonised Standard covering the essential requirements of article 3.2 of Directive 2014/53/EU,Total 122 Pages.

* cited by examiner

RESOURCE CONFIGURATION METHOD AND DEVICE

CROSS-REFERENCE TO RELATED APPLICATIONS

This application is a continuation of International Application No. PCT/CN2019/111338, filed on Oct. 15, 2019, the disclosure of which is hereby incorporated by reference in its entirety.

TECHNICAL FIELD

This application relates to the communication field, and in particular, to a resource configuration method in an unlicensed frequency band and a device.

BACKGROUND

In a 5th generation ($5^{th}$ generation, 5G) mobile communication system, a wireless device is supported in performing communication in an unlicensed frequency band (unlicensed band). In this manner, a same frequency domain resource needs to be shared and used by a plurality of different wireless devices.

In this system, different wireless devices need to occupy a shared frequency domain resource according to a rule. For example, 10 milliseconds (ms) is used as an access period, and a wireless device A needs to detect a channel occupation status before the access period, that is, perform clear channel assessment (clear channel assessment, CCA). If the wireless device A detects a wireless signal or detects strong wireless signal energy on a channel when performing CCA, the wireless device A determines that the channel detected in the current access period cannot be used, or the detected channel is occupied by another wireless device, and the wireless device A no longer sends information in the access period. If the wireless device A detects no wireless signal or detects no strong wireless signal energy on a channel when performing CCA, the wireless device A may send a signal in subsequent channel occupancy time (channel occupancy time, COT).

It is different from resource transmission performed based on a slot in a current NR system that, impact of an access period needs to be considered for resource transmission in an unlicensed frequency band. However, no corresponding solution is provided in a current technology. Therefore, how a network device configures an access period and channel occupancy time COT of a terminal device is still an urgent technical problem to be resolved.

SUMMARY

Embodiments of this application provide a resource configuration method and a device, so that a terminal device in an unlicensed frequency band learns of a configuration of a fixed frame period (fixed frame period, FFP) that includes COT and an idle period used for access.

According to a first aspect, this application provides a resource configuration method, and the method is performed by a network device. In the method, the network device sends FFP configuration information to a terminal device, where the FFP configuration information indicates an FFP configuration of the terminal device, an FFP is a period used by the terminal device to transmit a signal, the FFP includes channel occupancy time COT and an idle period Idle period, the channel occupancy time COT is used by the terminal device to transmit the signal, and the idle period is used by the terminal device to perform LBT.

According to a second aspect, this application further provides a resource configuration method, and the method is performed by a terminal device. In the method, the terminal device receives FFP configuration information from a network device, parses the FFP configuration information, and obtains an FFP configuration, where the FFP configuration information indicates the FFP configuration of the terminal device, an FFP is a period used by the terminal device to transmit a signal, the FFP includes channel occupancy time COT and an idle period Idle period, the channel occupancy time COT is used by the terminal device to transmit the signal, and the idle period is used by the terminal device to perform LBT.

According to the foregoing method, the network device can configure the FFP of the terminal device and send the FFP to the terminal device, so that the terminal device can contend for a channel based on the FFP configuration information indicated by the network device, and perform transmission after obtaining the channel through contention.

For example, the FFP configuration information may be carried in radio resource control (radio resource control, RRC) signaling.

In a possible design, the FFP configuration information includes one or more of the following:

- a time domain offset of the FFP relative to a system frame or relative to an FFP of the network device, indicating a start boundary of the FFP of the terminal device;
- duration of the COT;
- duration of the idle period of the FFP;
- duration of the FFP; and
- a start and length indicator value SLIV of a physical uplink shared channel PUSCH, indicating a configuration of a PUSCH in the COT.

Optionally, a unit of the time domain offset of the FFP relative to the system frame or relative to the FFP of the network device, is a symbol.

Optionally, the duration (duration) of the COT satisfies the following rule:

$$\text{COT duration}=L\times \text{rep}K\times \text{symbol\_length}$$

L represents a quantity L of symbols in the PUSCH in the COT, rep_K represents a quantity of PUSCHs in one period of COT, and symbol_length represents a length of a symbol in the PUSCH.

In a possible design, the network device further sends FFP scheduling information to the terminal device, and correspondingly, the terminal device receives the FFP scheduling information. The FFP scheduling information is used to schedule the terminal device to perform transmission in the FFP configured based on the FFP configuration information.

For example, the FFP scheduling information and the FFP configuration information may be carried in different signaling for sending, where the FFP configuration information is carried in RRC signaling, and the FFP scheduling information is carried in downlink control information (downlink control information, DCI).

When the FFP scheduling information is used to schedule one FFP, the FFP scheduling information may include a first offset, and the first offset indicates an offset of a start boundary of the FFP scheduled by the network device relative to a start boundary of a time domain resource on which the network device sends the FFP scheduling information.

When the FFP scheduling information is used to schedule a plurality of FFPs, the FFP scheduling information may include a quantity of times of transmission and a second offset, the quantity of times of transmission indicates a quantity of FFPs scheduled by the network device, and the second offset indicates an offset of a start boundary of the first FFP scheduled by the network device relative to a start boundary of a time domain resource on which the network device sends the FFP scheduling information.

For example, the FFP scheduling information and the FFP configuration information may be carried in same signaling for sending, and both the FFP configuration information and the FFP scheduling information are carried in RRC signaling.

The FFP scheduling information includes a time domain resource period and a bitmap of a time domain resource pattern, the time domain resource period indicates one time domain resource period to the terminal device, the one time domain resource period includes a plurality of FFPs, and the bitmap of the time domain resource pattern indicates whether each FFP of the plurality of FFPs can be used by the terminal device to perform transmission. When the FFP is not used by the terminal device to perform transmission, the FFP may be used by a network device in an unlicensed frequency band or another terminal device.

Optionally, the FFP scheduling information may alternatively not include the bitmap of the time domain resource pattern, but include only the time domain resource period. In this case, the plurality of FFPs in the time domain resource period scheduled by the network device are all used by the terminal device.

According to a third aspect, this application provides a communication apparatus configured to perform resource configuration. The communication apparatus has a function of implementing the method in any one of the first aspect and the possible implementations of the first aspect. The function may be implemented by hardware, or may be implemented by hardware executing corresponding software. The hardware or the software includes one or more units corresponding to the foregoing functions.

According to a fourth aspect, this application provides a communication apparatus configured to perform resource configuration. The communication apparatus has a function of implementing the method in any one of the second aspect and the possible implementations of the second aspect. The function may be implemented by hardware, or may be implemented by hardware executing corresponding software. The hardware or the software includes one or more units corresponding to the foregoing functions.

According to a fifth aspect, this application provides a communication apparatus. A structure of the communication apparatus includes a memory, a processor, and a communication module. The memory is configured to store a computer-readable program. The processor invokes instructions stored in the memory, to perform the method performed by the terminal device in the first aspect. The communication module is configured to receive data and/or send data under control of the processor. The communication module may be a transceiver, a communication interface, or an input/output interface.

Optionally, the communication apparatus may be a network device or a chip.

According to a sixth aspect, this application provides a communication apparatus. A structure of the communication apparatus includes a memory, a processor, and a communication module. The memory is configured to store a computer-readable program. The processor invokes instructions stored in the memory, to perform the method performed by the terminal device in the second aspect. The communication module is configured to receive data and/or send data under control of the processor. The communication module may be a transceiver, a communication interface, or an input/output interface.

Optionally, the communication apparatus may be a terminal device or a chip.

According to a seventh aspect, this application provides a computer-readable storage medium. The computer-readable storage medium stores computer instructions. When the computer instructions are run on a computer, the computer is enabled to perform the method in any one of the first aspect or the possible implementations of the first aspect.

According to an eighth aspect, this application provides a computer-readable storage medium. The computer-readable storage medium stores computer instructions. When the computer instructions are run on a computer, the computer is enabled to perform the method in any one of the second aspect or the possible implementations of the second aspect.

According to a ninth aspect, this application provides a chip, including a processor. The processor is configured to read and execute a computer program stored in a memory, to perform the method according to any one of the first aspect or the possible implementations of the first aspect.

Optionally, the chip further includes the memory, the memory and the processor are connected through a circuit or a wire, and the memory is configured to store the computer program.

Further, optionally, the chip further includes a communication interface or an input/output interface.

According to a tenth aspect, this application provides a chip, including a processor. The processor is configured to read and execute a computer program stored in a memory, to perform the method according to any one of the second aspect or the possible implementations of the second aspect.

Optionally, the chip further includes the memory, the memory and the processor are connected through a circuit or a wire, and the memory is configured to store the computer program.

Further, optionally, the chip further includes a communication interface or an input/output interface.

According to an eleventh aspect, this application further provides a computer program product. The computer program product includes computer program code. When the computer program code is run on a computer, the computer is enabled to perform the method in any one of the first aspect and the possible implementations of the first aspect.

According to a twelfth aspect, this application further provides a computer program product. The computer program product includes computer program code. When the computer program code is run on a computer, the computer is enabled to perform the method in any one of the second aspect and the possible implementations of the second aspect.

The technical solutions of this application provide a method for configuring an FFP of a terminal device by a network device in an unlicensed frequency band, and further provide flexible scheduling of a transmission resource of the terminal device by the network device, especially flexible scheduling of uplink transmission of the terminal device, so that requirements of different service types and scenarios can be met, and communication efficiency can be improved.

DESCRIPTION OF EMBODIMENTS

Figure 1:
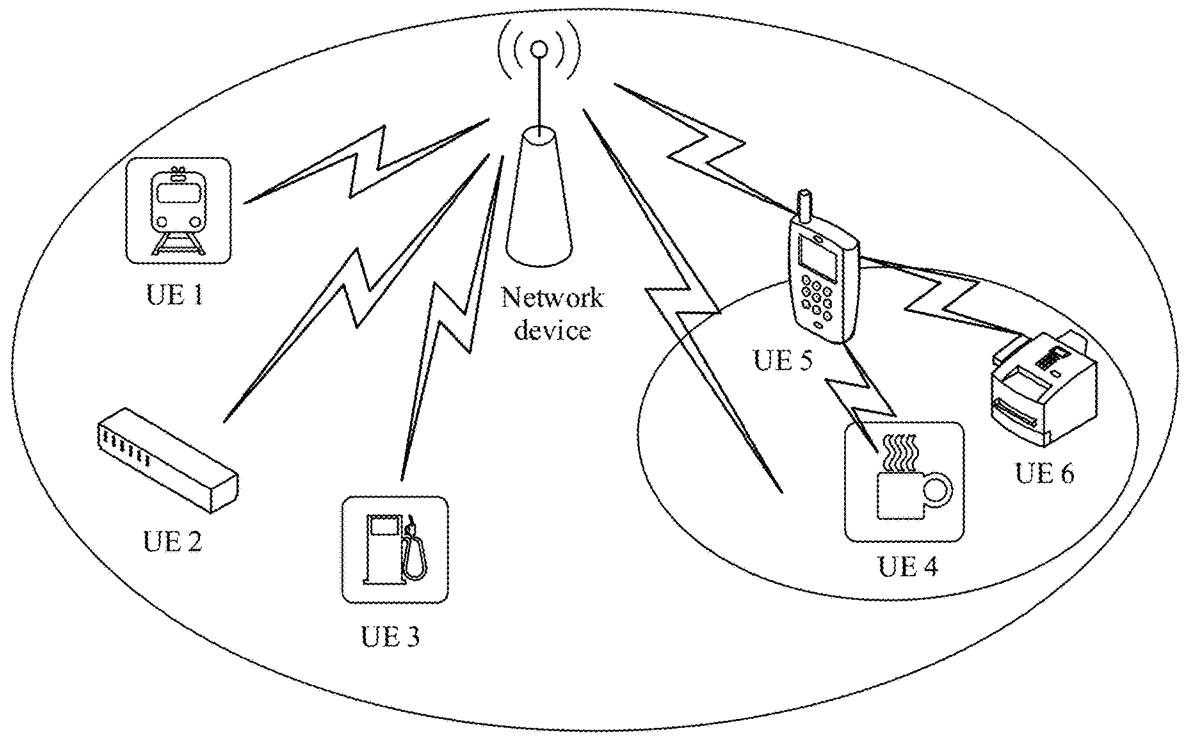
FIG. 1 is a schematic diagram of an application scenario according to an embodiment of this application.

The following describes technical solutions in this application with reference to the accompanying drawings.

The technical solutions of this application are mainly used in a wireless communication system working in an unlicensed (unlicensed) frequency band, for example, a new radio (new radio, NR) unlicensed system (referred to as NR-U below). In addition, the technical solutions may also be used in another communication system in which one communication device needs to indicate a channel access type to another communication device.

In the following, some terms in this application are described, to help a person skilled in the art have a better understanding.

A network device is a device that connects a terminal device to a wireless network in a communication system. The network device is a node in a radio access network, and may also be referred to as a base station or a radio access network (radio access network, RAN) node (or device).

Currently, some examples of the network device are: a gNB, a transmission reception point (transmission reception point, TRP), an evolved NodeB (evolved NodeB, eNB), a radio network controller (radio network controller, RNC), a NodeB (NodeB, NB), an access point (access point, AP), a base station controller (base station controller, BSC), a base transceiver station (base transceiver station, BTS), a home base station (for example, a home evolved NodeB or a home NodeB, HNB), a baseband unit (base band unit, BBU), an enterprise LTE discrete narrowband aggregation (Enterprise LTE Discrete Spectrum Aggregation, eLTE-DSA) base station, and the like.

In addition, in a network structure, the network device may include a centralized unit (centralized unit, CU) node and a distributed unit (distributed unit, DU) node. In this structure, protocol layers of an eNB in a long term evolution (long term evolution, LTE) system are separated. Functions of some protocol layers are all controlled by a CU, and functions of some or all of remaining protocol layers are distributed in DUs. The DUs are all controlled by the CU.

A terminal device is a device that provides voice and/or data connectivity for a user. The terminal device may also be referred to as user equipment (user equipment, UE), a terminal (terminal), a mobile station (mobile station, MS), a mobile terminal (mobile terminal, MT), or the like.

For example, the terminal device may be a handheld device, a vehicle-mounted device, or a roadside unit that has a wireless connection function. Currently, for example, some terminal devices are a mobile phone (mobile phone), a tablet computer, a notebook computer, a palmtop computer, a mobile internet device (mobile internet device, MID), an intelligent point of sale (point of sale, POS), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a smart meter (a smart water meter, a smart electrical meter, or a smart gas meter), eLTE-DSA UE, a device having an integrated access and backhaul (integrated access and backhaul, IAB) capability, a vehicle-mounted electronic control unit (electronic control unit, ECU), a vehicle-mounted computer, an in-vehicle cruise system, and a telematics box (telematics box, T-Box).

A bandwidth part (bandwidth part, BWP) is a segment of consecutive frequency resources in a carrier used in a cell managed by a network device. For example, one BWP may include K consecutive subcarriers, or include a frequency resource on which M consecutive and non-overlapping resource blocks (resource blocks, RBs) are located, or include a frequency resource on which N consecutive and non-overlapping resource block groups (resource block groups, RBGs) are located. K, M, and N are integers greater than 0. The BWP may also be referred to as a bandwidth resource, a bandwidth region, a frequency domain resource, a frequency resource part, or some frequency resources, or may have another name. This is not limited in this application.

"And/or" describes an association relationship between associated objects and represents that three relationships may exist. For example, A and/or B may represent three cases: There is only A, there are both A and B, and there is only B. The character "/" usually indicates an "or" relationship between the associated objects.

"A plurality of" in this application means two or more. "At least one" means one or more. In addition, it may be understood that in the descriptions of this application, terms such as "first" and "second" are merely used for distinguishing and description, and cannot be understood as an indication or implication of relative importance, or an indication or implication of an order.

FIG. 1 shows an example of an architecture of a communication system applicable to an embodiment of this application. As shown in FIG. 1, a network device and terminal devices UE 1 to UE 6 form a communication system. In the communication system, the UE 1 to the UE 6 may send uplink data to the network device, and the network device needs to receive the uplink data sent by the UE 1 to the UE 6. In addition, a communication system may alternatively include the UE 4 to the UE 6. In the communication system, the network device may send downlink information to the UE 1, the UE 2, and the UE 5. The UE 5 may also send downlink information to the UE 4 and the UE 6.

In an unlicensed frequency band, a transmit node needs to use the unlicensed frequency band in a contention manner. According to a definition of the European Telecommunications Standards Institute (European telecommunications standards institute, ETSI), channel access types of the unlicensed frequency band mainly include load based equipment (load based equipment, LBE) and fixed frame based equipment (frame based equipment, FBE). In other words, there are two channel detection mechanisms in the unlicensed frequency band: a frame-structure-based (that is, FBE-based) channel detection mechanism and a load-based (LBE-based) channel detection mechanism.

The load-based channel detection mechanism means that when a service arrives at a device, initial CCA detection is triggered. If the device detects, through the initial CCA, that a channel state is idle, the device may immediately occupy the channel, where channel occupancy time is preset. If the device detects, through the initial CCA, that a channel state is busy, a defer period (defer period) needs to be generated. If it is detected that the channel state is busy within the defer period, a defer period continues to be generated, and then an extended clear channel assessment (extended CCA, ECCA) is not performed until it is detected that the channel state is idle within a defer period.

Detection duration of the ECCA is determined by a quantity N of times of channel detection backoff, where N is a random CCA detection time value generated between (l, q), and q is preset. If in this period, it is detected that the channel state is busy in the CCA detection time, a defer period also needs to be generated, and an ECCA process is not continued until it is detected that the channel is idle within a defer period. The device can occupy the channel only after detecting, in N periods of CCA detection time, that the channel is idle, where channel occupancy time is also preset.

The FBE-based channel detection mechanism means that: a period is set, and listen before talk (listen before talk, LBT) channel detection is performed once at a fixed location in each period. For example, a CCA mechanism may be used to perform channel detection. Channel detection time is also referred to as channel clear assessment (channel clear assessment, CCA) detection time. If a device detects, in CCA detection time, that a channel state is idle, the device may immediately occupy the channel and obtain channel occupancy time. The channel occupancy time is a preconfigured fixed value. In the channel occupancy time, the device may perform transmission. When the channel occupancy time expires and the device needs to perform transmission, channel detection is performed again. If the device detects, in the CCA detection time, that the channel state is non-idle, the device cannot occupy the channel within this period, and continues to perform LBT channel detection at a fixed location in a next period.

Figure 2:
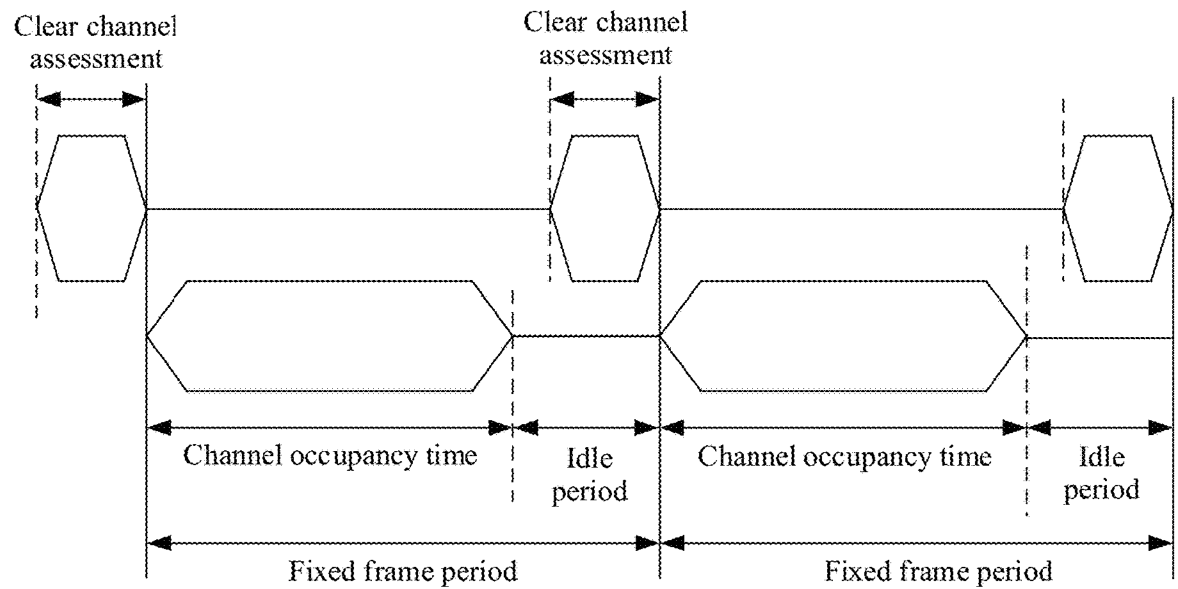
FIG. 2 is a schematic diagram of an FBE-based channel detection mechanism according to an embodiment of this application.

FIG. 2 is a schematic diagram of an FBE-based channel detection mechanism. An initiating device (initiating device) performs transmission based on an FBE frame, and a sending period of the FBE frame is referred to as a fixed frame period (fixed frame period, FFP). One fixed frame period may be considered as one FBE frame, that is, in an FBE mode, the initiating device performs transmission based on the FBE frame. One FFP includes two parts: channel occupancy time (channel occupancy time, COT) and an idle period (idle period), and duration of the FFP ranges from 1 ms to 10 ms. The COT is used by an FBE initiating device to send a signal, and the idle period is used by the FBE initiating device to perform CCA. For the first FFP, the initiating device backs off for a period of time and performs CCA before the COT starts. If a channel state is assessed as idle, the initiating device may send a signal in subsequent channel occupancy time. In some implementations, the initiating device may share a signal sending opportunity with one or more other devices during the COT. These devices are referred to as responding devices (responding devices). If an interval between a time point at which the initiating device sends the signal and a time point at which the responding device sends the signal is less than 16 μs, the responding device does not perform CCA, otherwise, the responding device needs to perform CCA whose duration is not less than 9 μs.

An FFP parameter is configured for the initiating device. This may be understood as that the FFP parameter is bound to the initiating device. In other words, different initiating devices may have different FFP configurations. The initiating device may be a network device, or may be a terminal device.

In an NR system, a length of a system frame (frame) is 10 ms, and a system frame number (system frame number, SFN) ranges from 0 to 1023. One system frame includes 10 subframes (subframes), a length of each subframe is 1 ms, and a subframe number in the one system frame ranges from 0 to 9. Each subframe includes several slots (slots), and a quantity of slots included in each subframe is related to a subcarrier spacing (subcarrier spacing, SCS).

However, in the FBE mode, a device (a network device or a terminal device) transmits a signal based on a fixed frame format. This application provides an FBE-mode-based uplink resource configuration method. Any one or more steps in a procedure shown in FIG. 3 may form a solution that needs to be protected in this application. For example, S410 and S420 may form a solution by using a network device as an execution body. S430 and S440 may form a solution by using a terminal device as an execution body. The method includes the following steps.

S410: The network device determines FFP configuration information of the terminal device. The FFP configuration information indicates an FFP configuration of the terminal device.

It can be learned from the foregoing descriptions that an FFP includes COT and an idle period. The network device determines (or configures) duration of the COT of the terminal device and duration of the idle period. The FFP configuration information indicates the duration of the COT of the terminal device and the duration of the idle period. The COT is used by the terminal device to transmit a signal. That the terminal device transmits the signal may be that the terminal device receives a signal or the terminal device sends a signal.

In some implementations, the network device may indicate duration of the FFP instead of the duration of the idle period. The terminal device may obtain the duration of the idle period based on the duration of the FFP and the duration of the COT.

The network device may determine a configuration parameter of the FFP, for example, the duration of the COT, the duration of the idle period, or the duration of the FFP, based on quality of service (quality of service, QoS) of a to-be-transmitted service and different service types (for example, an enhanced mobile broadband (enhanced mobile broadband, eMBB) service, an ultra-reliable low-latency communication (ultra-reliable low-latency communication, URLLC) service, or a massive machine-type communications (massive machine-type communications, mMTC) service). This application is not limited to the foregoing example. The network device may alternatively determine the FFP configuration information based on another factor.

When an uplink service requirement changes, the network device may reconfigure the FFP, and send reconfigured FFP configuration information to the terminal device, to reconfigure the FFP of the terminal device. For example, the uplink service requirement change may be a change of quality of service of an uplink service, and the network device may reconfigure the FFP configuration information based on a difference of QoS of different services. Alternatively, the uplink service requirement change may be a change of a type of an uplink service, and because different service types have different requirements on a latency, a throughput, and the like, a base station may reconfigure the FFP configuration information and perform RRC reconfiguration based on different service types. In this way, a service requirement can be met and a more flexible configuration can be implemented.

S420: The network device sends the FFP configuration information to the terminal device.

The FFP configuration information may be carried in radio resource control (radio resource control) signaling. Specifically, content included in the FFP configuration information may be embodied in a field of the RRC signaling. For example, an FBE configured grant configuration (FBE ConfiguredGrantConfig) may be newly added to the RRC signaling.

S430: The terminal device receives the FFP configuration information from the network device.

S440: The terminal device parses the FFP configuration information and obtains the FFP configuration.

It is different from a licensed frequency band that, when performing transmission in an unlicensed frequency band, the terminal device first contends for a channel, and starts transmission after obtaining the channel through contention. In this embodiment of this application, the terminal device obtains the FFP configuration information from the network device, and may learn of the FFP configuration to perform a subsequent action. This resolves a technical problem of configuring the FFP of the terminal device in the FBE mode. In addition, when the service type changes, the network device may reconfigure the FFP of the terminal device, to meet requirements of different service types, so that communication efficiency is improved.

The following provides example descriptions of FFP configuration information, where the FFP configuration information may include one or more of the following fields.

Figure 4:
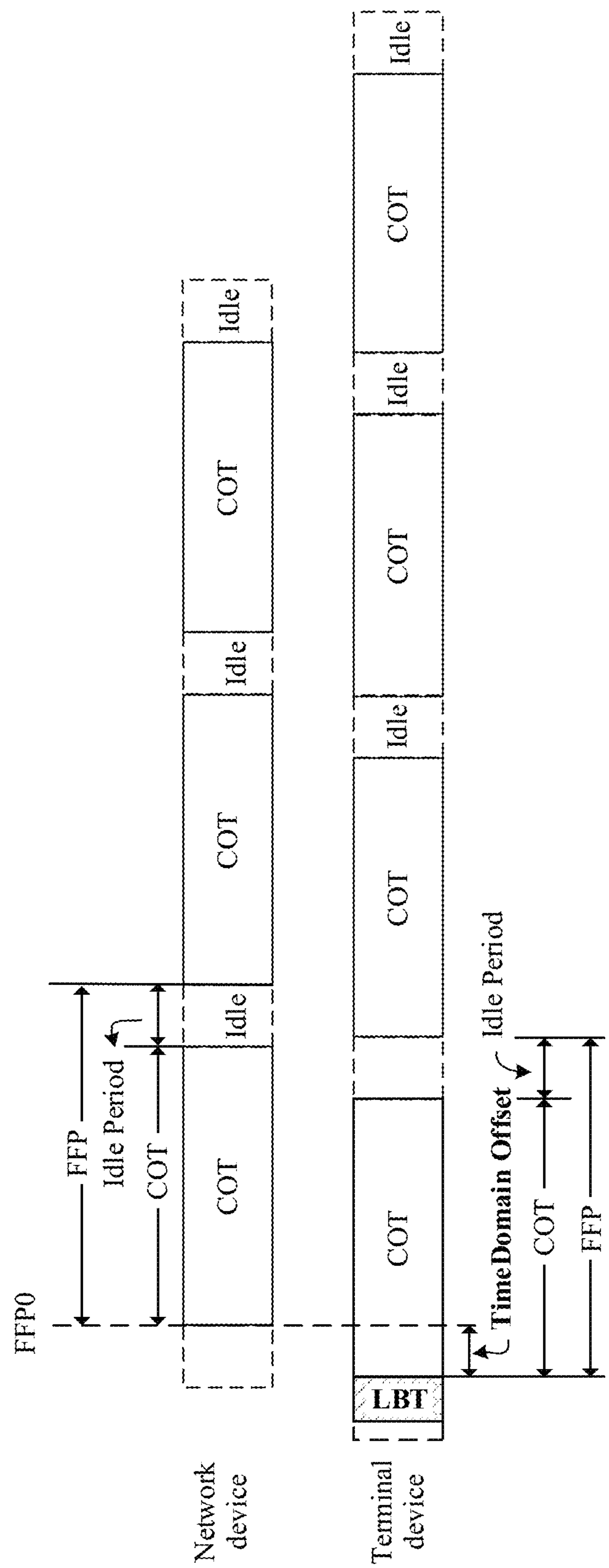
FIG. 4 is a schematic diagram of a time domain offset of an FFP of a terminal device relative to an FFP 0 of a network device according to an embodiment of this application.

(1) Time domain offset of an FFP of a terminal device relative to a system frame or relative to an FFP of a network device: The field indicates a start location of the FFP of the terminal device, and may be represented as “TimeDomainoffset”. Optionally, the field indicates a time domain offset of a start boundary of the FFP of the terminal device relative to a start boundary of a system frame 0, or the field indicates a time domain offset of a start boundary of the FFP of the terminal device relative to a start boundary of an FFP 0 of the network device. For example, the offset may be in a unit of a symbol. For example, when a value of the field is 1, it indicates that the FFP is offset by one symbol in time domain relative to the system frame 0 or relative to the start boundary of the FFP 0 of the network device. Alternatively, the offset may be an absolute time value. For example, when a value of the field is 1, the FFP is offset by 1 ms relative to the system frame 0 or relative to the start boundary of the FFP of the network device in time domain. It may be understood that the time domain offset may be a positive number, which means that the start boundary of the FFP of the terminal device is after the system frame 0 or after the start boundary of the FFP 0 of the network device. Alternatively, the time domain offset may be a negative number, which means that the start boundary of the FFP of the terminal device is before the start boundary of the system frame 0 or before the start boundary of the FFP of the network device. As shown in FIG. 4, the start boundary of the FFP of the terminal device is before the start boundary of the FFP 0 of the network device.

After obtaining the time domain offset of the FFP relative to the system frame 0 or relative to the FFP of the network device, the terminal device may know the start location of the FFP, that is, may know when the FFP starts. It may be understood that the start boundary of the system frame 0 or the FFP 0 of the network device is merely an example of a reference start point used to determine the start location of the FFP of the terminal device. In another implementation, the reference start point may alternatively be located in a system frame other than the system frame 0, or may be an FFP other than the FFP 0 of the network device. Alternatively, the reference start point may be an end boundary of the system frame or the FFP of the network device, or a time point in the system frame 0 or the FFP 0 of the network device.

(2) Duration of channel occupancy time COT of an FFP: The field indicates a time length of the COT in the FFP of the terminal device, and may be represented as COT duration. For example, the time length of the COT may be in a unit of a symbol. For example, when a value of the field is 5, it indicates that the time length of the COT may be five symbols. Alternatively, the time length of the COT may be an absolute time value. For example, when a value of the field is 5, it indicates that the time length of the COT may be 5 ms. It may be understood that the absolute time value may be in another time unit. The terminal device may obtain the duration of the COT in the FFP from the network device based on the field. In different embodiments, the COT is used by the terminal device to send a signal, or may be used by the terminal device to receive a signal. In other words, the COT is used by the terminal device to perform uplink transmission, or the COT may be used by the terminal device to perform downlink transmission.

(3) Duration of an idle period: The field indicates duration of the idle period in the FFP, and may be represented as “Idle Period”. For example, the duration of the idle period may be in a unit of a symbol. For example, when a value of the field is 2, it indicates that the duration of the idle period is two symbols. Alternatively, the duration of the idle period may be an absolute time value. For example, when a value of the field is 2, it indicates that the duration of the idle period is 2 ms. It may be understood that the absolute time value may be in another time unit. The terminal device may obtain the duration of the idle period in the FFP from the network device based on the field. The idle period may be used by the terminal device to perform channel listening before transmission.

(4) Duration of an FFP of a terminal device: The field indicates duration of the FFP. For example, the duration of the FFP may be in a unit of a symbol. For example, when a value of the field is 140, it indicates that the duration of the FFP is 140 symbols. Alternatively, the duration of the FFP may be an absolute time value. For example, when a value of the field is 10, it indicates that the duration of the FFP is 10 ms. It may be understood that the absolute time value may be in another time unit. The terminal device may obtain the duration of the FFP from the network device based on the field. In some embodiments, even if the FFP configuration information does not include the duration of the idle period, the terminal device may obtain the duration of the idle period based on the duration of the FFP and the duration of the COT.

(5) Start and length indicator value (start and length indicator value, SLIV) of a physical uplink shared channel (physical uplink shared channel, PUSCH): The field indicates a start symbol offset S of a PUSCH signal and a quantity L of symbols included in the PUSCH. In other words, the field indicates when the terminal device starts to send the PUSCH and duration of the PUSCH. For example, an initial value of S is 0, which means that after LBT succeeds, the terminal device immediately sends the PUSCH in the COT. A value range of L is 1 to 4, indicating that a length of the PUSCH may be 1 to 4 symbols. The terminal device may consecutively transmit one or more PUSCHs in the COT. For the network device, one PUSCH represents one complete demodulation unit. In some embodiments, PUSCHs are transmitted consecutively, and a subsequent PUSCH is transmitted immediately after the first PUSCH. The terminal device obtains a starttime point and the SLIV of the PUSCH from the network device, and may learn how to transmit the PUSCH in the COT.

Figure 5:
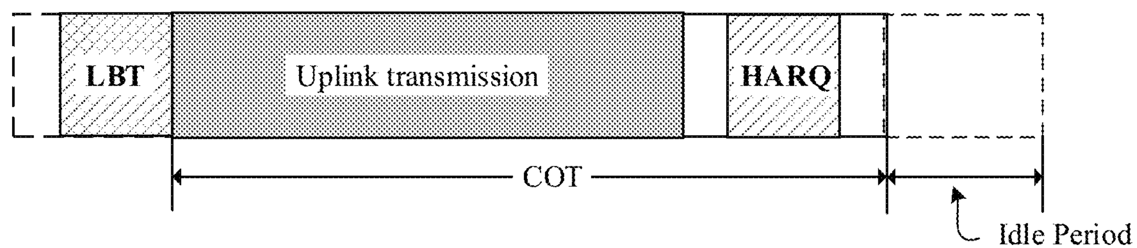
FIG. 5 is a schematic diagram of feeding back a HARQ in an FFP according to another embodiment of this application.

In another embodiment, the FFP configuration information may further include a self-contained hybrid automatic repeat request (hybrid automatic repeat request, HARQ) resource configuration, and the field may be represented as "Self-contain HARQ resource configuration". As shown in FIG. 5, a network device configures a time domain resource in COT of a terminal device. The time domain resource is used by the terminal device to receive HARQ information sent by the network device. The HARQ information indicates that a result of demodulating, by the network device, a PUSCH sent in current COT is an acknowledgment (acknowledgment, ACK) message or a negative acknowledgment (negative acknowledgment, NACK). Optionally, the time domain resource may be further used to feed back downlink feedback information (downlink feedback information, DFI) of the terminal device, and the DFI is used to feed back the demodulation result of the PUSCH.

Therefore, the terminal device may receive feedback from the network device in advance, and determine, based on a feedback result, whether retransmission is required, so that communication efficiency can be improved.

It may be understood that FFP configuration information may include more or fewer fields. For example, when the network device does not configure a BWP-related parameter (for example, frequency domain resource indication information), the FFP configuration information may carry the following information.

(1) Bandwidth part (bandwidth part, BWP) index identifier (identifier, ID) of a terminal device: This information indicates a BWP index ID allocated to the terminal device for performing FFP. A BWP of the terminal device is a segment of consecutive bandwidth resources allocated by a network side to the terminal device. Different BWPs may be configured for different terminal devices, and a channel resource configuration of the terminal device is allocated and scheduled in the BWP.

(2) Subcarrier spacing of a BWP of a terminal device: The subcarrier spacing may be used to determine a symbol length. For example, if a PUSCH occupies several symbols, a length of the PUSCH may be determined.

(3) Frequency domain resource location indication of a BWP of a terminal device: The frequency domain resource location indication may be represented as "FrequencyDomainAllocation".

Figure 3:
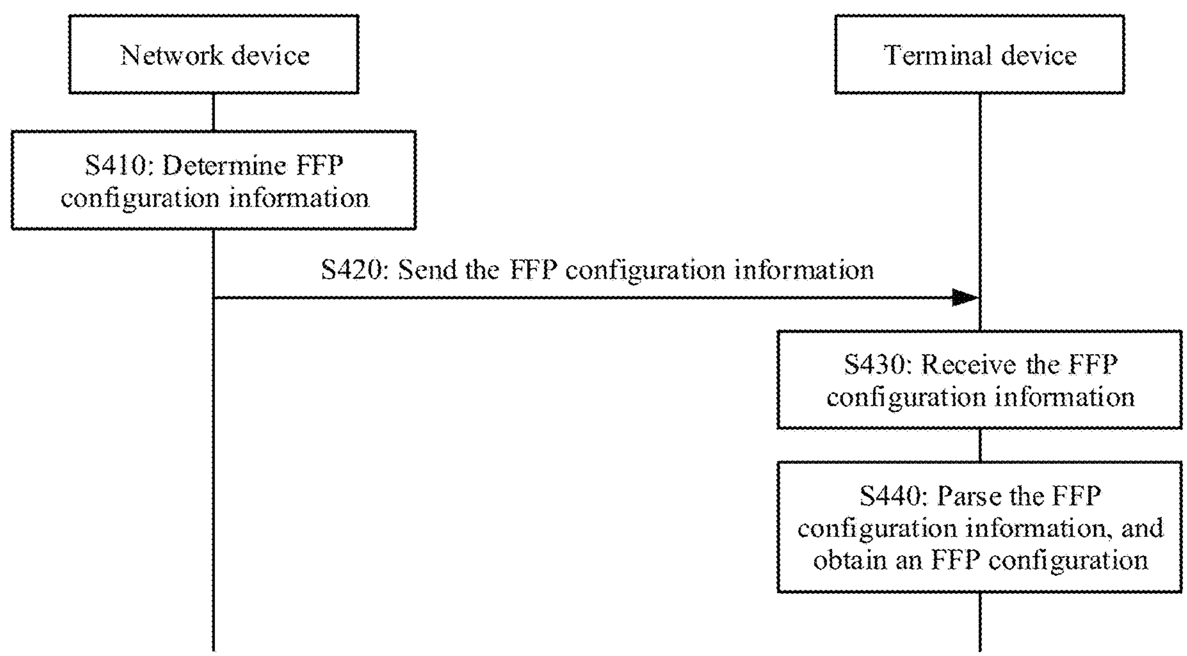
FIG. 3 is a flowchart of a resource configuration method according to an embodiment of this application.

In some implementations, the terminal device can be triggered to perform transmission only after the network device schedules the terminal device. This manner may be referred to as scheduled uplink (scheduled uplink, SUL) transmission, and is a mechanism in which the network device dynamically schedules the terminal device to perform uplink transmission. The terminal device sends an uplink signal based on the scheduling of the network device. The network device may schedule a plurality of PUSCHs at a time. The method shown in FIG. 3 is further described.

In S410, the network device further determines first FFP scheduling information, where the first FFP scheduling information is used to schedule the terminal device to perform transmission in an FFP configured based on the first FFP configuration information.

In S420, the network device sends the first FFP scheduling information to the terminal device.

In S430, the terminal device receives the first FFP scheduling information from the network device, and attempts to perform transmission based on the FFP scheduling information. This is because the terminal device first performs LBT in an unlicensed frequency band, and performs transmission after obtaining a channel through contention. After obtaining the FFP scheduling information from the network device, the terminal device performs transmission based on a time domain location indicated by the FFP scheduling information.

For example, the FFP configuration information and the first FFP scheduling information may be carried in different signaling. For example, the FFP configuration information is carried in RRC signaling, and the first FFP scheduling information is carried in DCI.

After an FFP configuration of the terminal device is completed based on the FFP configuration information, the terminal device already knows a structure of the FFP and knows how to perform transmission, but performs transmission after the network device allocates a time domain resource. In other words, the transmission of the terminal device requires scheduling of the network device. The network device sends the DCI to the terminal device, to trigger the terminal device to perform LBT, and perform transmission after obtaining a channel through contention.

In a design, the network device schedules a transmission resource to the terminal device, and the transmission resource is one FFP in time domain. It can be learned that the transmission resource is a time domain resource. It may be understood that the network device schedules the terminal device to perform transmission in the one FFP. The first FFP scheduling information may include a first offset, and the first offset indicates an offset of a start boundary of the time domain resource of the terminal device scheduled by the network device relative to a start boundary of a time domain resource on which the network device sends the first FFP scheduling information. In other words, the first offset indicates an offset of a start boundary of the time domain resource of the terminal device scheduled by the network device relative to a start boundary of a time domain resource on which the network device sends the DCI. For example, a unit of the first offset may be a symbol, or a unit of the first offset may be an FFP, and the first offset may be represented as “TimeoffsetToGrant”.

Optionally, the first offset may alternatively indicates an offset of a start boundary of COT scheduled by the network device relative to the start boundary of the time domain resource on which the network device sends the first FFP scheduling information. In this case, the transmission resource allocated by the network device may be one period of COT. In other words, the network device schedules the terminal device to perform transmission in one period of COT.

Therefore, after receiving the first FFP scheduling information, the terminal device may learn of the time domain resource allocated by the network device, complete LBT before the start location of the time domain resource, and perform transmission after obtaining a channel through contention.

Figure 6:
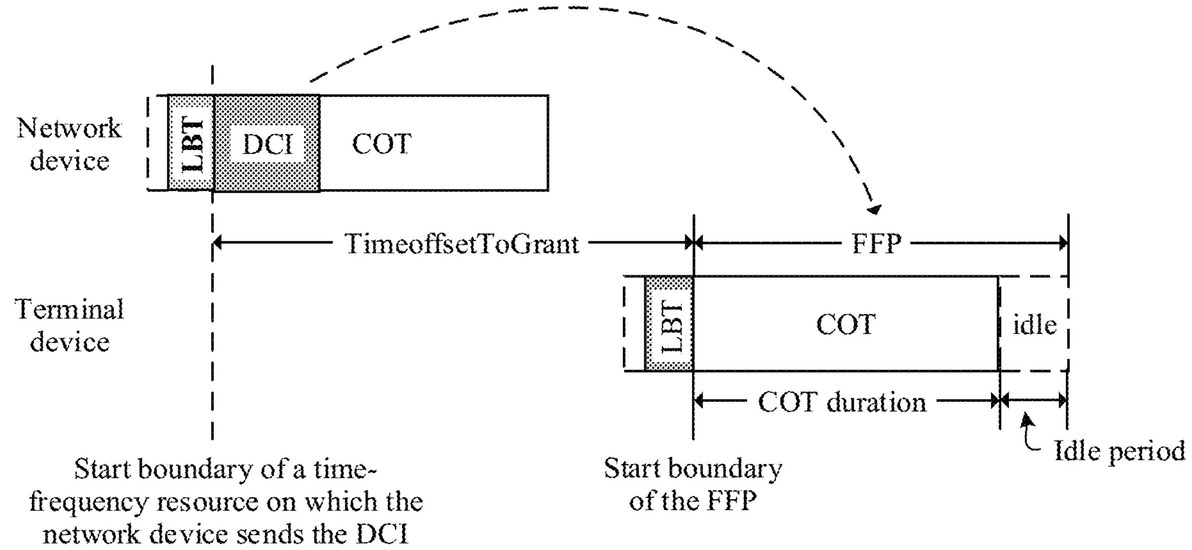
FIG. 6 is a simple schematic diagram of scheduling, by a network device, a terminal device to perform transmission according to still another embodiment of this application.

For example, as shown in FIG. 6, a network device sends DCI to a terminal device on a time domain resource. Optionally, the DCI may be uplink scheduling (uplink grant, UL grant). In an example in FIG. 6, the network device schedules one FFP, and the terminal device determines, based on a first offset included in the DCI, an FFP for transmission, completes LBT before a start boundary of the FFP, and performs transmission after obtaining a channel through contention.

When one FFP is scheduled, more flexible scheduling may be implemented. On the other hand, the network device sends less FFP scheduling information to the terminal device, so that signaling overheads can also be reduced.

In another design, the network device schedules a time domain resource of the terminal device, where the time domain resource includes a plurality of FFPs in time domain. It may be understood that the network device schedules the terminal device to perform transmission in the plurality of FFPs. The first FFP scheduling information may include a quantity of times of transmission and a second offset. The quantity of times of transmission indicates a quantity of FFPs scheduled by the network device, and may be represented as “Times of UL transmission”. The second offset indicates an offset of a start boundary of the first FFP in the plurality of FFPs scheduled by the network device relative to a start boundary of a time domain resource on which the network device sends the FFP scheduling information, or the second offset indicates an offset of the time domain resource of the terminal device scheduled by the network device relative to a start boundary of a time domain resource on which the network device sends the first FFP scheduling information. For example, a unit of the second offset may be a symbol, or a unit of the second offset may be an FFP, and the second offset may be represented as “TimeoffsetToGrant”.

Optionally, the quantity of times of transmission indicates a quantity of periods of COT allocated by the network device, and may be represented as “Times of UL transmission”. The second offset indicates an offset of a start boundary of the first period of COT in the plurality of periods of COT scheduled by the network device relative to a start boundary of a time domain resource on which the network device sends the FFP scheduling information. It may be understood as that the second offset indicates an offset of a start boundary of a transmission resource allocated by the network device to the terminal device. In this case, the transmission resource allocated by the network device may alternatively be a plurality of periods of COT. In other words, the network device schedules the terminal device to perform transmission in the plurality of periods of COT. For example, a unit of the second offset may be a symbol, or a unit of the second offset may be COT, and the second offset may be represented as “TimeoffsetToGrant”.

Figure 7:
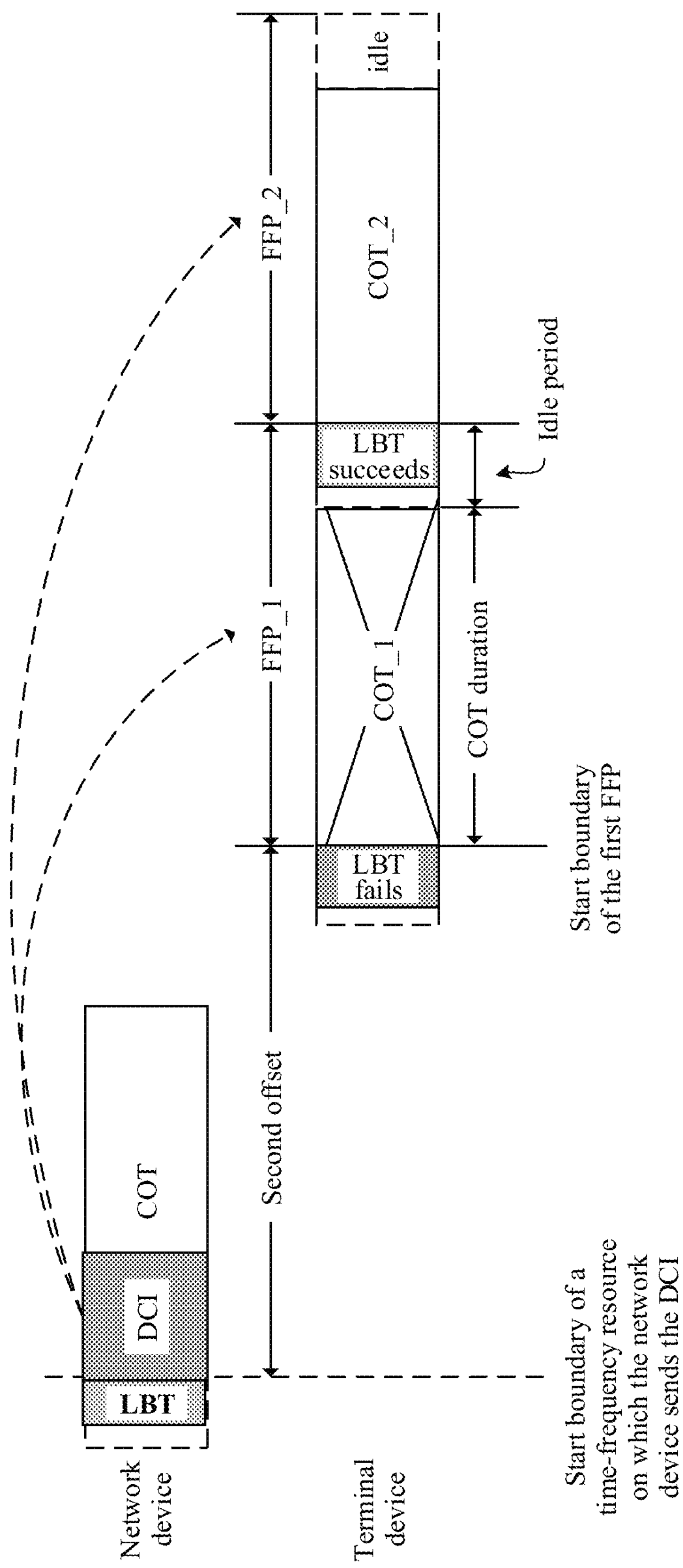
FIG. 7 is a simple schematic diagram of scheduling, by a network device, a terminal device to perform transmission according to still another embodiment of this application.

Because the network device schedules a plurality of FFPs or periods of COT for the terminal device, even if the terminal device fails in LBT and does not obtain a channel through contention before one FFP or COT, the terminal device may still have an opportunity to perform LBT again. As shown in FIG. 7, a network device sends DCI to a terminal device on a segment of time domain resources. The network device schedules two FFPs: FFP_1 and FFP_2. The terminal device learns of an allocated time domain resource based on the DCI, and performs LBT before a start boundary of FFP_1. When the LBT fails, the terminal device cannot perform transmission. The terminal device may perform LBT before a start boundary of FFP_2, that is, perform the LBT in an idle period of FFP_1. When the LBT succeeds, the terminal device obtains a channel through contention for transmission.

It can be learned that when a plurality of FFPs or periods of COT are scheduled, because there are a plurality of transmission opportunities, even if LBT fails, the terminal device still performs LBT in a next FFP, so that access time of the terminal device can be shortened.

In some other implementations, the network device may configure that signaling carrying FFP configuration information further carries second FFP scheduling information. In other words, the FFP configuration information and second FFP scheduling information may be carried in same signaling, for example, RRC signaling. This manner may be referred to as automatic uplink (automatic uplink, AUL) transmission, and is a mechanism in which the network device semi-persistently schedules periodic uplink transmission of the terminal device. After receiving activation signaling, the terminal device may periodically send an uplink signal on a preconfigured time domain resource until deactivation signaling is received. To be specific, the terminal device starts to send the uplink signal after receiving the activation signaling, and stops sending the uplink signal after receiving the deactivation signaling. The time domain resource may include a plurality of FFPs. A quantity of PUSCHs transmitted in periods of COT in the plurality of FFPs is configurable, and quantities of PUSCHs transmitted in periods of COT in different FFPs may be the same or may be different.

The second FFP scheduling information may include an automatic uplink (Automatic Uplink, AUL) transmission time domain resource period (AUL time resource pattern period), a unit of the period is a length of an FFP, and the automatic uplink transmission time domain resource period indicates a quantity of FFPs. For example, when a value of the field is N, it indicates that one time domain resource period includes N FFPs, where N is a positive integer greater than or equal to 1.

When the FFP configuration information and the FFP scheduling information are carried in same signaling, the terminal device may configure an FFP structure by using one piece of signaling and schedule the terminal device to perform transmission, so that signaling overheads can be reduced.

Optionally, the FFP scheduling information may further include an AUL time domain resource pattern (pattern) bitmap (bit map), and the bitmap indicates which FFP in an AUL time domain resource period is used for uplink transmission. A bit value corresponding to an FFP indicates whether the corresponding FFP is for effective uplink transmission. For example, when a bit is 1, it indicates that the corresponding FFP is for effective uplink transmission, and when a bit is 0, it indicates that the corresponding FFP is forbidden to be used for uplink transmission. Alternatively, when a bit is 0, it indicates that the corresponding FFP is for effective uplink transmission, and when a bit is 1, it indicates that the corresponding FFP is forbidden to be used for uplink transmission. In some implementations, the network device may allocate, to another terminal device or the network device, a time domain resource corresponding to an FFP that is forbidden to be used for uplink transmission. In other words, the network device schedules another terminal device on a time domain resource on which an FFP that is forbidden to be used for uplink transmission is located to perform transmission, or the network device performs transmission. It may be understood that the FFP is not limited to being used for uplink transmission, and may also be used for downlink transmission.

Figure 8:
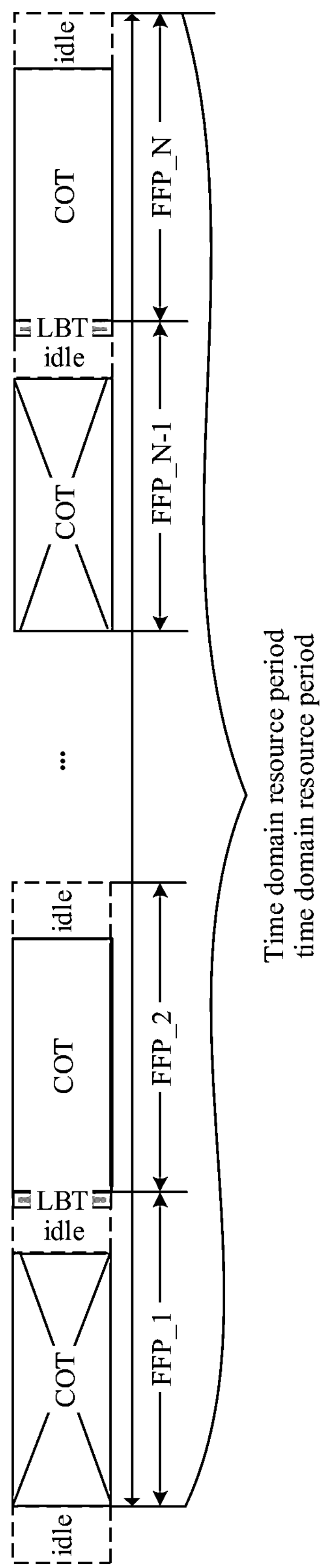
FIG. 8 is a schematic diagram of a time domain resource period configured by a network device according to an embodiment of this application.

FIG. 8 is a schematic diagram of an AUL time domain resource period. A start boundary of the AUL time domain resource period has an offset relative to a system frame 0, where the offset is indicated by TimeDomainOffset in FFP configuration information. The AUL time domain resource period includes N FFPs, which are represented by FFP_1, FFP_2, . . . , FFP_N. Each FFP includes COT and an idle period. In the example in FIG. 8, an AUL time domain resource pattern bitmap is 010101 . . . 01, and bit values 0 and 1 are cyclically set, where 0 indicates that a corresponding FFP is forbidden to be used for uplink transmission, and 1 indicates that a corresponding FFP is for effective uplink transmission. FFP_1 and FFP_2 are used as an example. FFP_1 corresponds to the first bit in the bitmap, and if the bit is 0, it indicates that FFP_1 is forbidden to be used for transmission, and a terminal device does not perform uplink transmission in FFP_1. FFP_2 corresponds to the second bit in the bitmap, and if the bit is 1, it indicates that FFP_2 is for effective uplink transmission, and the terminal device performs LBT before COT of FFP_2 starts, and performs uplink transmission when LBT succeeds.

In still another implementation, a network device may further configure and schedule an FFP by using a field in a configured grant configuration (ConfiguredGrantConfig) in RRC signaling. In this case, the network device re-interprets the RRC signaling, and the terminal device re-interprets the field in the RRC signaling. For example, the terminal device re-interprets the following fields in the RRC signaling.

(1) A time domain offset (TimeDomainOffset) indicates an offset of an FFP of the terminal device relative to a system frame or relative to an FFP of the network device. In ConfiguredGrantConfig, TimeDomainOffset indicates an offset of a transmission resource scheduled by the network device relative to a system frame 0, where the offset is in a unit of a slot. In this implementation, the offset may be an offset of a start boundary of an FFP relative to a start boundary of the system frame 0 or relative to a start boundary of an FFP 0 of the network device. For example, the offset may be in a unit of a symbol. For example, when a value of the field is 1, it indicates that the FFP is offset by one symbol in time domain relative to the system frame 0 or relative to the start boundary of the FFP 0 of the network device. Alternatively, the offset may be an absolute time value. For example, when a value of the field is 1, the FFP is offset by 1 ms relative to the system frame 0 or relative to the start boundary of the FFP of the network device in time domain. It may be understood that the time domain offset may be a positive number, which means that the start boundary of the FFP of the terminal device is after the system frame 0 or after the start boundary of the FFP 0 of the network device. Alternatively, the time domain offset may be a negative number, which means that the start boundary of the FFP of the terminal device is before the start boundary of the system frame 0 or before the start boundary of the FFP of the network device.

(2) A time domain allocation (TimeDomainAllocation) indicates a configuration of a time domain resource that includes an SLIV and that is of the terminal device. In ConfiguredGrantConfig, TimeDomainAllocation indicates a time-domain configuration of an uplink configuration grant including the SLIV. In this implementation, in other words, the field indicates when the terminal device starts to send a PUSCH and duration of the PUSCH. For example, an initial value of S is 0, which means that after LBT succeeds, the terminal device immediately sends the PUSCH in the COT. A value range of L is 1 to 4, indicating that a length of the PUSCH may be 1 to 4 symbols.

(3) Rep_K indicates a quantity of PUSCHs in the COT of the FFP of the terminal device. In this embodiment, the terminal device may learn of the duration of the COT according to the following rule:

$$\text{COT duration}=L\times Rep\_K\times \text{symbol\_length}$$

L represents a quantity of symbols in one PUSCH, Rep_K represents a quantity of PUSCHs in one period of COT, and symbol_length represents a symbol length corresponding to a subcarrier spacing of a BWP of the terminal device.

With reference to the time domain offset and the duration of the COT, the terminal device may obtain idle duration. Specifically, when start boundaries of two adjacent periods of COT are determined, the idle duration may be obtained if the duration of the COT is known. The terminal device may further obtain, based on a period (periodicity) in ConfiguredGrantConfig in the RRC signaling, a time domain resource of the terminal device scheduled by the network device, namely, a time domain resource period.

After the foregoing re-interpretation, the terminal device may obtain an FFP configuration, for example, a start boundary, duration of COT, duration of an idle period, and how to transmit a PUSCH in the COT.

The foregoing re-interpretation of some fields in ConfiguredGrantConfig can reduce signaling overheads. Especially in a scenario in which the network device works in an FBE mode, it may be understood as that a cell corresponding to the network device is an FBE-mode-based cell. In the FBE cell, the network device may use ConfiguredGrantConfig in RRC signaling for FFP configuration. When finding that a current cell is an FBE cell, the terminal device re-interprets some fields in the RRC signaling, to obtain the FFP configuration.

The foregoing describes in detail the resource configuration method provided in this application. The following describes resource configuration apparatuses provided in this application.

Figure 9:
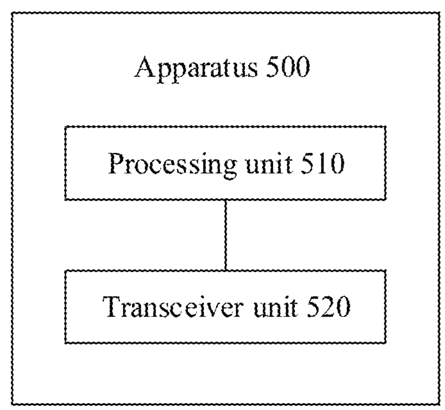
FIG. 9 is a schematic diagram of modules of a communication apparatus according to an embodiment of this application.

FIG. 9 is a schematic block diagram of a resource configuration communication apparatus 500 according to this application. As shown in FIG. 9, the communication apparatus 500 includes a processing unit 510 and a transceiver unit 520.

The processing unit 510 is configured to determine fixed frame period FFP configuration information of a terminal device, where an FFP is a period used by the terminal device to transmit a signal, the FFP includes channel occupancy time COT and an idle period Idle period, the channel occupancy time COT is used by the terminal device to transmit the signal, and the idle period is used by the terminal device to perform LBT.

The transceiver unit 520 is configured to send the fixed frame period FFP configuration information to the terminal device.

For the FFP configuration information, refer to descriptions in the foregoing embodiments, and details are not described herein again.

In an embodiment, the processing unit 510 is further configured to determine first FFP scheduling information, where the first FFP scheduling information is used to schedule the terminal device to perform transmission in an FFP configured based on the FFP configuration information. The transceiver unit 520 is further configured to send the first FFP scheduling information to the terminal device. The FFP configuration information and the first FFP scheduling information are carried in different signaling. For example, the FFP configuration information is carried in RRC signaling, and the first FFP scheduling information is carried in DCI. For the first scheduling information, refer to descriptions in the foregoing embodiments. Details are not described herein again.

In another embodiment, the processing unit 510 may configure that the signaling carrying the FFP configuration information further carries second FFP scheduling information, where the second FFP scheduling information is used to schedule the terminal device to perform transmission in the FFP configured based on the FFP configuration information. For example, the FFP configuration information and second configuration information are carried in the RRC signaling and sent by the transceiver unit 520. For the second configuration information, refer to descriptions in the foregoing embodiments. Details are not described herein again.

Optionally, the apparatus 500 may be a chip or an integrated circuit.

Optionally, the processing unit 510 may be a processor.

Optionally, the transceiver unit 520 may be a transceiver, and the transceiver may include a transmitter and a receiver, and have both receiving and sending functions.

Optionally, the transceiver unit 520 may further be an input/output interface or an input/output circuit.

Optionally, the transceiver unit 520 may be a communication interface, for example, an input/output interface circuit, an input interface circuit, and an output interface circuit.

The apparatus 500 may correspond to the network device in resource configuration method embodiments provided in this application. Units included in the apparatus 500 are respectively configured to implement corresponding operations and/or procedures performed by the network device in method embodiments.

For example, the processing unit 510 is configured to perform operations and/or steps implemented inside the terminal device in method embodiments. For example, the processing unit 510 is configured to determine an FFP configuration of the terminal device.

The transceiver unit 520 is configured to send the FFP configuration information, the first FFP scheduling information, the second FFP scheduling information, or the like to the terminal device.

Figure 10:
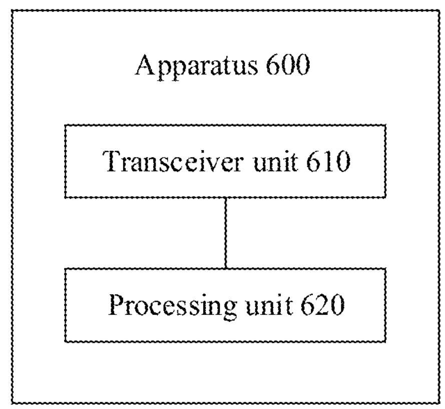
FIG. 10 is a schematic diagram of modules of a communication apparatus according to another embodiment of this application.

FIG. 10 is a schematic block diagram of a resource configuration communication apparatus 600 according to this application. As shown in FIG. 17, the apparatus 600 includes a processing unit 620 and a transceiver unit 610.

The transceiver unit 610 is configured to receive FFP configuration information from a network device, where the FFP configuration information indicates an FFP configuration of a terminal device, an FFP is a period used by the terminal device to transmit a signal, the FFP includes channel occupancy time COT and an idle period Idle period, the channel occupancy time COT is used by the terminal device to transmit the signal, and the idle period is used by the terminal device to perform LBT.

The processing unit 620 is configured to parse the FFP configuration information and obtain the FFP configuration.

For the FFP configuration information, refer to descriptions in the foregoing embodiments, and details are not described herein again. In an embodiment, the transceiver unit 610 is further configured to receive first FFP scheduling information from the network device, where the first FFP scheduling information is used to schedule the terminal device to perform transmission in an FFP configured based on the FFP configuration information. The FFP configuration information and the first FFP scheduling information are carried in different signaling. For example, the FFP configuration information is carried in RRC signaling, and the first FFP scheduling information is carried in DCI. For the first scheduling information, refer to descriptions in the foregoing embodiments. Details are not described herein again.

In another embodiment, the transceiver unit 610 is further configured to receive second FFP scheduling information from the network device, where the second FFP scheduling information is used to schedule the terminal device to perform transmission in the FFP configured based on the FFP configuration information. For example, the FFP configuration information and second configuration information are carried in the RRC signaling and received by the transceiver unit 610. For the second configuration information, refer to descriptions in the foregoing embodiments. Details are not described herein again.

Optionally, the apparatus 600 may be a chip or an integrated circuit.

Optionally, the transceiver unit 610 may be a transceiver, and the transceiver may include a transmitter and a receiver, and have both receiving and sending functions.

Optionally, the transceiver unit 610 may further be an input/output interface or an input/output circuit.

Optionally, the transceiver unit 610 may be a communication interface, for example, an input/output interface circuit, an input interface circuit, and an output interface circuit.

Optionally, the processing unit 620 may be a processor.

The apparatus 600 may correspond to the network device in resource configuration method embodiments provided in this application. Units included in the apparatus 600 are respectively configured to implement corresponding operations and/or procedures performed by the terminal device in method embodiments.

The transceiver unit 610 is configured to perform the step of receiving a message and/or information from the network device in method embodiments. For example, the transceiver unit 610 is configured to receive an FFP configuration message, the first FFP scheduling information, the second FFP scheduling information, or the like from the network device.

The processing unit 620 is configured to perform operations and/or steps implemented inside the terminal device in method embodiments. For example, the processing unit 620 is configured to determine the FFP configuration of the terminal device based on the FFP configuration message, for example, duration of the FFP, and proportions of the COT and the idle period.

The chip in this embodiment of this application may be a field-programmable gate array (field-programmable gate array, FPGA), an application-specific integrated chip (application-specific integrated circuit, ASIC), a system on chip (system on chip, SoC), a central processing unit (central processor unit, CPU), a network processor (Network Processor, NP), a digital signal processing circuit (digital signal processor, DSP), or may be a microcontroller (micro controller unit, MCU), a programmable logic device (programmable logic device, PLD), or another integrated chip.

This application further provides a network device 700. The following provides descriptions with reference to FIG. 11.

Figure 11:
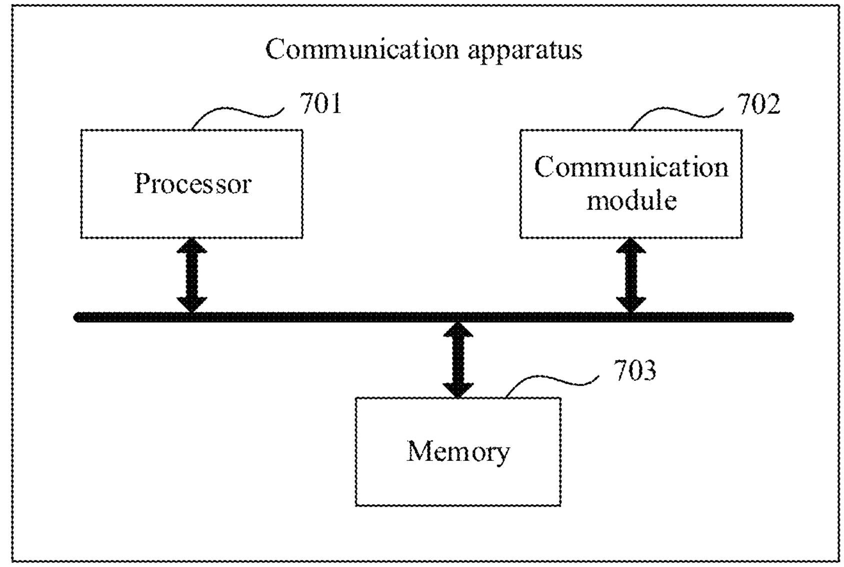
FIG. 11 is a simplified schematic diagram of a structure of a communication apparatus according to an embodiment of this application.

FIG. 11 is a schematic diagram of a structure of a communication apparatus 700 according to this application. The communication apparatus 700 is configured to implement functions of the network device in method embodiments, and may be a network device or a chip. The communication apparatus 700 includes a processor 701, a communication module 702, and a memory 703.

The processor 701 is configured to read a program in the memory 703, to perform the following process.

The processor 701 is configured to determine fixed frame period FFP configuration information of a terminal device, where an FFP is a period used by the terminal device to transmit a signal, the FFP includes channel occupancy time COT and an idle period Idle period, the channel occupancy time COT is used by the terminal device to transmit the signal, and the idle period is used by the terminal device to perform LBT.

The processor 701 is configured to control the communication module 702 to send the fixed frame period FFP configuration information to the terminal device.

The communication module 702 is configured to receive a signal and/or send a signal.

In an embodiment, the processor 701 is further configured to determine first FFP scheduling information, where the first FFP scheduling information is used to schedule the terminal device to perform transmission in an FFP configured based on the FFP configuration information. The processor 701 is further configured to control the communication module 702 to send the first FFP scheduling information to the terminal device. The FFP configuration information and the first FFP scheduling information are carried in different signaling. For example, the FFP configuration information is carried in RRC signaling, and the first FFP scheduling information is carried in DCI. For the first scheduling information, refer to descriptions in the foregoing embodiments. Details are not described herein again.

In another embodiment, the processor 701 may configure that the signaling carrying the FFP configuration information further carries second FFP scheduling information, where the second FFP scheduling information is used to schedule the terminal device to perform transmission in the FFP configured based on the FFP configuration information. For example, the FFP configuration information and second configuration information are carried in the RRC signaling and sent by the communication module 702. For the second configuration information, refer to descriptions in the foregoing embodiments. Details are not described herein again.

The processor 701, the communication module 702, and the memory 703 are interconnected through a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

In FIG. 11, a bus architecture may include any quantity of interconnected buses and bridges, and specifically connects various circuits of one or more processors represented by the processor 701 and a memory represented by the memory 703. The bus architecture may further connect various other circuits such as a peripheral device, a voltage stabilizer, and a power management circuit. These are well known in the art, and therefore are not further described in this specification. A bus interface provides an interface. The communication module 702 may be a plurality of elements. To be specific, the communication module 702 includes a transmitter and a communication unit, and provides units configured to communicate with various other apparatuses on a transmission medium. Alternatively, the communication module 702 may be a single element, for example, may be a transceiver or a communication interface located on a chip. The processor 701 is responsible for managing the bus architecture and general processing. The memory 703 may store data used when the processor 701 performs an operation.

Optionally, the processor 701 may be a central processing unit, an application-specific integrated circuit ASIC, a field-programmable gate array FPGA, or a complex programmable logic device (complex programmable logic device, CPLD).

Figure 12:
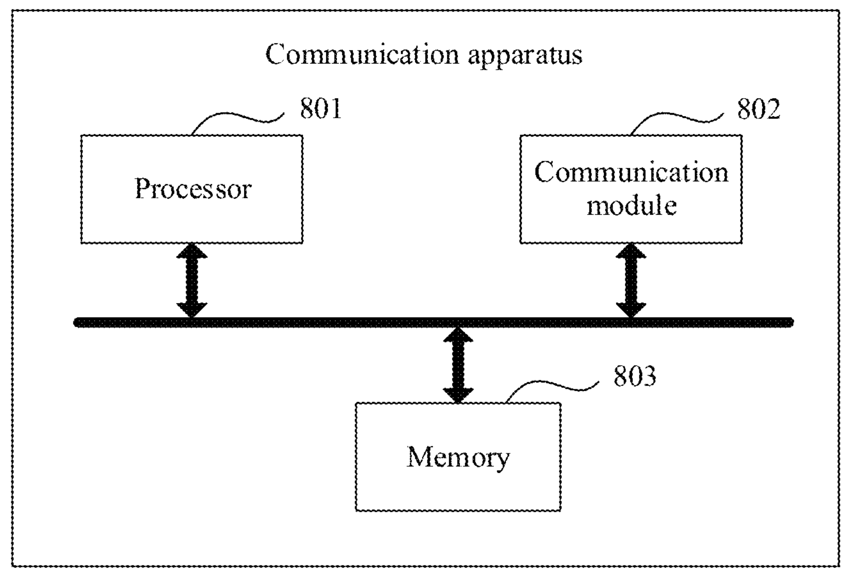
FIG. 12 is a simplified schematic diagram of a structure of a communication apparatus according to another embodiment of this application.

FIG. 12 is a schematic diagram of a structure of a communication apparatus 800 according to this application. The communication apparatus 800 is configured to implement functions of the network device in method embodiments, and may be a network device or a chip. The communication apparatus 800 includes a processor 801, a communication module 802, and a memory 803.

The processor 801 is configured to read a program in the memory 803, to perform the following process.

The processor 801 is configured to receive FFP configuration information from a network device through the communication module 802, where the FFP configuration information indicates an FFP configuration of a terminal device, an FFP is a period used by the terminal device to transmit a signal, the FFP includes channel occupancy time COT and an idle period Idle period, the channel occupancy time COT is used by the terminal device to transmit the signal, and the idle period is used by the terminal device to perform LBT.

The processor 801 is configured to parse the FFP configuration information and obtain the FFP configuration.

The communication module 802 is configured to receive a signal and/or send a signal.

For the FFP configuration information, refer to descriptions in the foregoing embodiments, and details are not described herein again. In an embodiment, the communication module 802 is further configured to receive first FFP scheduling information from the network device, where the first FFP scheduling information is used to schedule the terminal device to perform transmission in an FFP configured based on the FFP configuration information. The FFP configuration information and the first FFP scheduling information are carried in different signaling. For example, the FFP configuration information is carried in RRC signaling, and the first FFP scheduling information is carried in DCI. For the first scheduling information, refer to descriptions in the foregoing embodiments. Details are not described herein again.

In another embodiment, the communication module 802 is further configured to receive second FFP scheduling information from the network device, where the second FFP scheduling information is used to schedule the terminal device to perform transmission in the FFP configured based on the FFP configuration information. For example, the FFP configuration information and second configuration information are carried in the RRC signaling and received by the communication module 802. For the second configuration information, refer to descriptions in the foregoing embodiments. Details are not described herein again.

The processor 801, the communication module 802, and the memory 803 are interconnected through a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

In FIG. 12, a bus architecture may include any quantity of interconnected buses and bridges, and specifically connects various circuits of one or more processors represented by the processor 801 and a memory represented by the memory 803. The bus architecture may further connect various other circuits such as a peripheral device, a voltage stabilizer, and a power management circuit. These are well known in the art, and therefore are not further described in this specification. A bus interface provides an interface. The communication module 802 may be a plurality of elements. To be specific, the communication module 802 includes a transmitter and a communication unit, and provides units configured to communicate with various other apparatuses on a transmission medium. Alternatively, the communication module 802 may be a single element, for example, may be a transceiver or a communication interface located on a chip. The processor 801 is responsible for managing the bus architecture and general processing. The memory 803 may store data used when the processor 801 performs an operation.

Optionally, the processor 801 may be a central processing unit, an application-specific integrated circuit ASIC, a field-programmable gate array FPGA, or a complex programmable logic device (complex programmable logic device, CPLD).

In addition, this application provides a computer-readable storage medium. The computer-readable storage medium stores computer instructions. When the computer instructions are run on a computer, the computer is enabled to perform corresponding operations and/or procedures performed by the network device in method embodiments.

This application provides a computer-readable storage medium. The computer-readable storage medium stores computer instructions. When the computer instructions are run on a computer, the computer is enabled to perform corresponding operations and/or procedures performed by the terminal device in method embodiments.

This application further provides a computer program product. The computer program product includes computer program code. When the computer program code is run on a computer, the computer is enabled to perform corresponding operations and/or procedures performed by the network device in the resource configuration method provided in this application.

This application further provides a computer program product. The computer program product includes computer program code. When the computer program code is run on a computer, the computer is enabled to perform corresponding operations and/or procedures performed by the terminal device in the resource configuration method provided in this application.

This application further provides a chip, including a processor. The processor is configured to invoke and run a computer program stored in a memory, to perform corresponding operations and/or procedures performed by the network device in the resource configuration method provided in this application.

Optionally, the chip further includes a memory, and the memory is connected to the processor. The processor is configured to read and execute the computer program in the memory.

Further, optionally, the chip includes a communication interface. The processor is connected to the communication interface. The communication interface is configured to receive a signal and/or data that need/needs to be processed. The processor obtains the signal and/or data from the communication interface, and processes the signal and/or data.

This application further provides a chip, including a processor. The processor is configured to invoke and run a computer program stored in the memory, to perform corresponding operations and/or procedures performed by the terminal device in the resource configuration method provided in this application.

Optionally, the chip further includes a memory, and the memory is connected to the processor. The processor is configured to read and execute the computer program in the memory.

Further, optionally, the chip includes a communication interface. The processor is connected to the communication interface. The communication interface is configured to receive a signal and/or data that need/needs to be processed. The processor obtains the signal and/or data from the communication interface, and processes the signal and/or data.

Optionally, the communication interface in the foregoing embodiments may be an input/output interface, and may specifically include an input interface and an output interface. Alternatively, the communication interface may be an input/output circuit, and may specifically include an input circuit and an output circuit.

The memory and the memory in the foregoing embodiments may be physically independent units, or the memory may be integrated with the processor.

In the foregoing embodiments, the processor may be a central processing unit (central processing unit, CPU), a microprocessor, an application-specific integrated circuit (application-specific integrated circuit, ASIC), one or more integrated circuits configured to control execution of programs in the technical solutions of this application, or the like. For example, the processor may be a digital signal processor device, a microprocessor device, an analog-to-digital converter, or a digital-to-analog converter. The processor may allocate control and signal processing functions of the terminal device or the network device among these devices based on respective functions of these devices. In addition, the processor may have functions of operating one or more software programs. The software programs may be stored in the memory. The functions of the processor may be implemented by hardware, or may be implemented by hardware executing corresponding software. The hardware or the software includes one or more modules corresponding to the foregoing function.

The memory may be a read-only memory (read-only memory, ROM), another type of static storage device that can store static information and instructions, a random access memory (random access memory, RAM) or another type of dynamic storage device that can store information and instructions, an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, any other medium that can be used to carry or store expected program code in a form of an instruction or a data structure and that can be accessed by a computer, or the like.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In several embodiments provided in this application, it should be understood that the disclosed system, apparatus, and method may be implemented in other manners. For example, described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other similar forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the part contributing to the conventional technology in the technical solutions of this application or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. The protection scope of this application shall be subject to the protection scope of the claims.

What is claimed is:

1. A communication apparatus, comprising:

one or more processors; and a transceiver coupled to the one or more processors, wherein the one or more processors are configured to determine fixed frame period (FFP) configuration information, the FFP configuration information indicates an FFP configuration of a terminal device, an FFP is a period for the terminal device to transmit a signal, the FFP comprises channel occupancy time (COT) and an idle period, the channel occupancy time (COT) is used by the terminal device to transmit the signal, and the idle period is for the terminal device to perform listen before talk (LBT), and wherein the transceiver is configured to send the FFP configuration information and FFP scheduling information to the terminal device, wherein the FFP scheduling information is used to schedule the terminal device to perform transmission in the FFP configured based on the FFP configuration information, wherein the FFP scheduling information comprises a time domain resource period indicating one time domain resource period to the terminal device and the one time domain resource period includes a plurality of FFPs in time domain, and wherein the FFP scheduling information comprises a bitmap of a time domain resource pattern, and the bitmap of the time domain resource pattern indicates whether each FFP of the plurality of FFPs can be used by the terminal device to perform transmission.

2. The communication apparatus according to claim 1, wherein the FFP configuration information comprises one or more of the following:

a time domain offset of the FFP relative to a system frame or relative to an FFP of a network device, indicating a start boundary of the FFP of the terminal device, duration of the COT, duration of the idle period of the FFP, duration of the FFP, or a start and length indicator value (SLIV) of a physical uplink shared channel (PUSCH), indicating a configuration of a PUSCH in the COT.

3. The communication apparatus according to claim 2, wherein the FFP scheduling information comprises a first offset, and the first offset indicates an offset of a start boundary of the FFP scheduled by the communication apparatus relative to a start boundary of a time domain resource on which the network device sends the FFP scheduling information.

4. The communication apparatus according to claim 2, wherein the FFP scheduling information comprises a quantity of times of transmission and a second offset, the quantity of times of transmission indicates a quantity of FFPs scheduled by the communication apparatus, and the second offset indicates an offset of a start boundary of the first FFP scheduled by the communication apparatus relative to a start boundary of a time domain resource on which the communication apparatus sends the FFP scheduling information.

5. The communication apparatus according to claim 1, wherein a unit of the time domain offset of the FFP relative to the system frame or relative to the FFP of the network device is a symbol.

6. The communication apparatus according to claim 1, wherein the duration of the COT satisfies the following rule:

COT duration=$L \times repK \times$symbol_length, wherein

L represents a quantity L of symbols in the PUSCH in the COT, rep_K represents a quantity of PUSCHs in one period of COT, and symbol_length represents a length of a symbol in the PUSCH.

7. A communication apparatus, comprising:

a transceiver; and one or more processors coupled to the transceiver, wherein the transceiver is configured to receive fixed frame period (FFP) configuration information from a network device, wherein the FFP configuration information indicates an FFP configuration of a terminal device, an FFP is a period for the terminal device to transmit a signal, the FFP comprises channel occupancy time (COT) and an idle period, the channel occupancy time (COT) is for the terminal device to transmit the signal, and the idle period is for the terminal device to perform listen before talk (LBT), wherein the one or more processors are configured to parse the FFP configuration information and obtain the FFP configuration, wherein the one or more processors are further configured to receive FFP scheduling information from the network device, wherein the FFP scheduling information is used to schedule the communication apparatus to perform transmission in the FFP configured based on the FFP configuration information, and wherein the FFP scheduling information comprises a time domain resource period indicating one time domain resource period to the terminal device and the one time domain resource period includes a plurality of FFPs in time domain, and wherein the FFP scheduling information comprises a bitmap of a time domain resource pattern, and the bitmap of the time domain resource pattern indicates whether each FFP of the plurality of FFPs can be used by the terminal device to perform transmission.

8. The communication apparatus according to claim 7, wherein the FFP configuration information comprises one or more of the following:

a time domain offset of the FFP relative to a system frame or relative to an FFP of the network device, indicating a start boundary of the FFP of the terminal device, duration of the COT, duration of the idle period of the FFP, duration of the FFP, or a start and length indicator value (SLIV) of a physical uplink shared channel (PUSCH), indicating a configuration of a PUSCH in the COT.

9. The communication apparatus according to claim 7, wherein the FFP scheduling information comprises a first offset, and the first offset indicates an offset of a start boundary of the FFP of the network device relative to a start boundary of a time domain resource on which the network device sends the FFP scheduling information.

10. The communication apparatus according to claim 7, wherein the FFP scheduling information comprises a quantity of times of transmission and a second offset, the quantity of times of transmission indicates a quantity of FFPs of the network device, and the second offset indicates an offset of a start boundary of the first FFP of the network device relative to a start boundary of a time domain resource on which the network device sends the FFP scheduling information.

11. The communication apparatus according to claim 8, wherein a unit of the time domain offset of the FFP relative to the system frame or relative to the FFP of the network device is a symbol.

12. The communication apparatus according to claim 11, wherein the duration of the COT satisfies the following rule:

COT duration=$L \times repK \times$symbol_length, wherein

L represents a quantity L of symbols in the PUSCH in the COT, rep_K represents a quantity of PUSCHs in one period of COT, and symbol_length represents a length of a symbol in the PUSCH.

13. A method for configuring a resource in an unlicensed frequency band, comprising:

sending, by a network device, fixed frame period (FFP) configuration information to a terminal device, wherein the FFP configuration information indicates an FFP configuration of the terminal device, the FFP is a period for the terminal device to transmit a signal, the FFP comprises channel occupancy time (COT) and an idle period, the channel occupancy time COT is for the terminal device to transmit the signal, and the idle period is used by the terminal device to perform listen before talk (LBT); and sending, by the network device, FFP scheduling information to the terminal device, wherein the FFP scheduling information is used to schedule the terminal device to perform transmission in the FFP configured based on the FFP configuration information, wherein the FFP scheduling information comprises a time domain resource period indicating one time domain resource period to the terminal device and the one time domain resource period includes a plurality of FFPs in time domain, and wherein the FFP scheduling information comprises a bitmap of a time domain resource pattern, and the bitmap of the time domain resource pattern indicates whether each FFP of the plurality of FFPs can be used by the terminal device to perform transmission.

14. A method for configuring a resource in an unlicensed frequency band, comprising:

receiving, by a terminal device, fixed frame period (FFP) configuration information from a network device, wherein the FFP configuration information indicates an FFP configuration of the terminal device, an FFP is a period used by the terminal device to transmit a signal, the FFP comprises channel occupancy time (COT) and an idle period, the channel occupancy time (COT) is used by the terminal device to transmit the signal, and the idle period is used by the terminal device to perform listen before talk (LBT);

parsing, by the terminal device, the FFP configuration information and obtaining the FFP configuration; and receiving, by the terminal device, FFP scheduling information from the network device, wherein the FFP scheduling information is used to schedule the communication apparatus to perform transmission in the FFP configured based on the FFP configuration information, wherein the FFP scheduling information comprises a time domain resource period indicating one time domain resource period to the terminal device and the one time domain resource period includes a plurality of FFPs in time domain, and wherein the FFP scheduling information comprises a bitmap of a time domain resource pattern, and the bitmap of the time domain resource pattern indicates whether each FFP of the plurality of FFPs can be used by the terminal device to perform transmission.

* * * * *